US008191736B2

(12) United States Patent
Beranger

(10) Patent No.: US 8,191,736 B2
(45) Date of Patent: Jun. 5, 2012

(54) FLUID DISPENSER

(75) Inventor: Stephane Beranger, Surtauville (FR)

(73) Assignee: Valois SAS, Le Neubourg (FR)

( * ) Notice: Subject to any disclaimer, the term of this patent is extended or adjusted under 35 U.S.C. 154(b) by 481 days.

(21) Appl. No.: 12/467,760

(22) Filed: May 18, 2009

(65) Prior Publication Data

US 2009/0283549 A1 Nov. 19, 2009

Related U.S. Application Data

(60) Provisional application No. 61/089,129, filed on Aug. 15, 2008.

(30) Foreign Application Priority Data

May 19, 2008 (FR) ..................................... 08 53221

(51) Int. Cl.

*B65D 41/17* (2006.01)
*B65D 41/10* (2006.01)
*B65D 41/04* (2006.01)
*B65D 41/00* (2006.01)
*G01F 11/00* (2006.01)

(52) U.S. Cl. .................. 222/321.7; 222/321.8; 215/318; 220/289

(58) Field of Classification Search .... 222/321.7–321.9, 222/372, 378, 383.1; 215/273–276, 318; 220/288, 289
See application file for complete search history.

(56) References Cited

U.S. PATENT DOCUMENTS

| | | | | |
|---|---|---|---|---|
| 3,371,813 | A | 3/1968 | Owen et al. | |
| 4,576,299 | A * | 3/1986 | Lecinski, Jr. | 215/318 |
| 4,863,030 | A * | 9/1989 | Bayer et al. | 206/427 |
| 4,981,230 | A * | 1/1991 | Marshall et al. | 215/252 |
| 6,575,339 | B2 * | 6/2003 | Jourdin et al. | 222/321.7 |
| 6,595,395 | B2 * | 7/2003 | Jourdin et al. | 222/321.9 |
| 7,134,565 | B1 * | 11/2006 | Wan et al. | 215/276 |
| 2006/0273115 | A1 * | 12/2006 | De Pous | 222/321.9 |

FOREIGN PATENT DOCUMENTS

| | | |
|---|---|---|
| FR | 2 809 711 A1 | 12/2001 |
| FR | 2 907 768 A1 | 5/2008 |

* cited by examiner

*Primary Examiner* — Darren W Gorman
(74) *Attorney, Agent, or Firm* — Sughrue Mion, PLLC

(57) ABSTRACT

A fluid dispenser comprising: a fluid reservoir (1) provided with a neck (11) that is externally threaded and that internally defines an opening (10) that communicates with the inside of the reservoir, the neck (11) forming at least one helical thread (12); a dispenser head (2) mounted on the neck (11) of the reservoir (1), the head (2) comprising: a dispenser member (3), such as a pump or a valve; a pusher (4) for actuating the dispenser member (3); and a fastener member (5, 6) engaged both with the threaded neck (11) of the reservoir (1) and with the dispenser member; the fluid dispenser being characterized in that the fastener member (5, 6) comprises: a deformable and malleable skirt (51) for coming into engagement with the threaded neck (11); and a rigid hoop (6) that is engaged around the skirt (51) so as to push the skirt radially against the threaded neck (11) in such a manner as to deform the skirt (51) against the thread (12) so as to create a thread imprint (530) in the skirt.

11 Claims, 6 Drawing Sheets

FLUID DISPENSER

CROSS REFERENCE TO RELATED APPLICATION

This application claims the benefit under 35 U.S.C. §119 (e) of pending U.S. provisional patent application Ser. No. 61/089,129, filed Aug. 15, 2008, and priority under 35 U.S.C. §119(a)-(d) of French patent application No. FR-08.53221, filed May 19, 2008.

TECHNICAL FIELD

The present invention relates to a fluid dispenser comprising: a fluid reservoir provided with a neck that is externally threaded and that internally defines an opening that communicates with the inside of the reservoir. The dispenser further comprises a dispenser head mounted on the neck of the reservoir, the head comprising: a dispenser member, such as a pump or a valve; a pusher for actuating the dispenser member; and a fastener member engaged both with the threaded neck of the reservoir and with the dispenser member. Such dispensers are frequently used in the fields of perfumery, cosmetics, or even pharmacy.

BACKGROUND OF THE INVENTION

In general, the fastener member comprises a rigid skirt that internally forms one or more threads for co-operating with the threaded neck of the reservoir. In order to put the dispenser head into place on the reservoir, it suffices to screw the threaded-skirt fastener member onto the threaded neck of the reservoir.

A first drawback of that screw-fastener member resides in the fact that it is not always easy to determine the torque required to screw the fastener member on the threaded neck of the reservoir in order to obtain appropriate tightness. Another drawback with that screw-fastener member resides in the fact that the threaded skirt of the fastener member need not always come into abutment against the shoulder of the neck at the end of screw tightening. More precisely, the neck of the reservoir generally projects from a shoulder that forms a portion of the body of the reservoir. For appearance reasons, it is advantageous for the bottom edge of the skirt of the fastener member to come into abutment against the shoulder of the reservoir at the end of screw tightening. However, this is not always possible as a result of the shoulder not always being situated at the same distance from the threads of the neck. Consequently, at the end of screw tightening, it often happens that a gap remains between the bottom edge of the skirt of the fastener member and the shoulder of the reservoir. Not only is this unattractive, but it also leads the user to believe that the dispenser head is not properly mounted on the reservoir. Finally, mounting a screw-fastener member requires the use of a special mounting machine that generates controlled turning.

BRIEF SUMMARY OF THE INVENTION

An object of the present invention is to remedy the above-mentioned drawbacks of the prior art by defining a fluid dispenser having a fastener member that presents all the advantages of being capable of being unscrewed, without having the drawbacks needing to be screwed tight.

To do this, the fastener member of the dispenser comprises: a deformable and malleable skirt for coming into engagement with the threaded neck; and a rigid hoop that is engaged around the skirt so as to push the skirt radially against the threaded neck in such a manner as to deform the skirt against the thread of the neck so as to create a thread imprint in the skirt. The skirt of the fastener member is thus brought into engagement with the threaded neck by an inwardly-directed radial movement, and not by an axial turning movement, as with threaded skirts of the prior art. Before the skirt is mounted for the first time on a threaded neck, the skirt does not include any thread imprint: it is only while radial thrust is being applied by means of the hoop, that the thread imprint is created by plastic deformation of the deformable and malleable skirt. It is not necessary for the deformation of the skirt to be instantaneous. In any event, the material constituting the deformable and malleable skirt creeps plastically around the threads of the neck of the reservoir in order to achieve a final state with a satisfactory thread imprint.

In another advantageous aspect of the present invention, the skirt comes into contact with the neck over less than half the periphery of the neck. This makes it possible to have limited or discrete local contact between the skirt and the neck so as to reduce friction forces while unscrewing. If the skirt comes into contact with the threads of the neck over its entire periphery, it is practically impossible to unscrew the fastener member using reasonable torque, i.e. torque that it is possible to obtain by means of two hands. Advantageously, the skirt is internally provided with a plurality of beads for being deformed by the thread of the neck. Thus, contact with the thread of the neck is performed only at the beads that are distributed around the neck in discrete manner. The beads are preferably elongate and extend substantially transversally to the thread. The beads may thus be in the form of vertical splines or bars that are deformed or indented by the thread of the neck so as to form the thread imprint. The beads may extend on either side of the thread. Finally, at least one thread imprint is formed in some of the beads, each imprint comprising a bottom wall and two opposite flanks. By means of the beads, a discontinuous thread imprint is obtained that enables the dispenser head to be unscrewed easily.

Naturally, it is necessary for the skirt to be made of a plastics material, that is more deformable than the threads of the neck. With regard to the hoop, it is made of a material that is more rigid than the material of the skirt, e.g. a metal.

In an advantageous embodiment, the skirt includes flexible tabs that are separated by slots. The skirt may thus be brought into engagement around the neck without needing to exert considerable stress on the fastener member. In a practical embodiment, each tab may be provided with at least one elongate bead. Naturally, it is possible to provide two or even more beads on each tab.

The spirit of the present invention is to use a skirt and hoop fastener member for bringing the skirt into contact with the threaded neck in a radial direction and not in an axial direction. Skirt and hoop fastener members are already known for being used with non-threaded necks to apply traction on the skirt for the purpose of flattening the neck gasket. In the present invention, there is no traction on the skirt, but merely radial thrust for causing it to deform against the threaded neck.

The fastener member is thus engaged with the threads of the neck by radial movement, and then behaves like a conventional screw fastener that can be unscrewed and screwed. The dispenser may thus be opened by unscrewing the fastener member so as to refill or recycle the dispenser by separating the reservoir and the dispenser head.

BRIEF DESCRIPTION OF THE DRAWINGS

The invention is described more fully below with reference to the accompanying drawings which show an embodiment of the invention by way of non-limiting example.

DETAILED DESCRIPTION OF THE INVENTION

Figure 1:
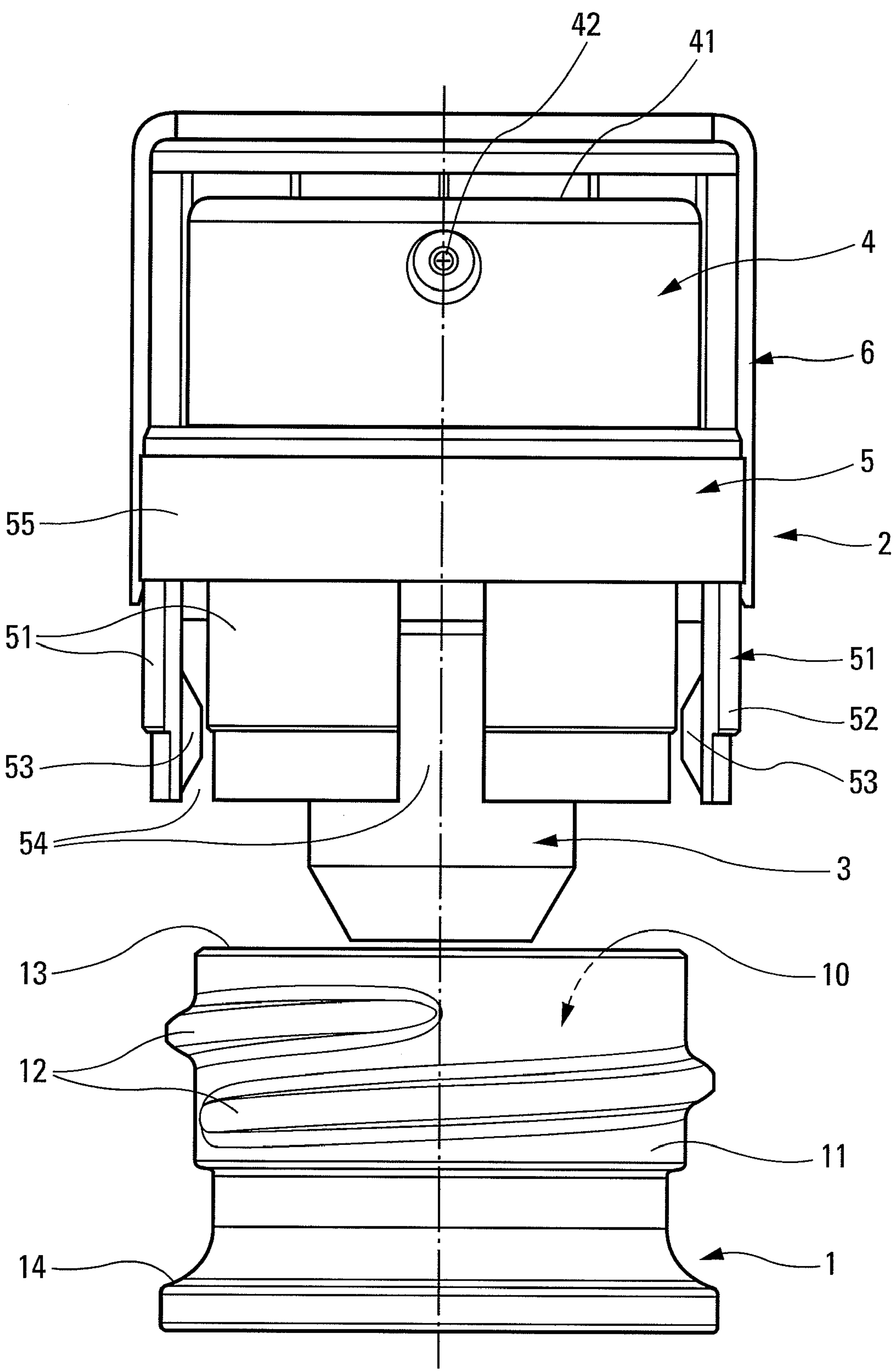
FIGS. 1 to 6 are views showing a fluid dispenser of the invention during various successive mounting and removal steps.

The fluid dispenser shown in the figures in order to illustrate the present invention comprises two distinct parts or sub-assemblies, namely a fluid reservoir 1 and a dispenser head 2 for mounting on the reservoir so as to co-operate with each other to constitute the dispenser.

The fluid reservoir 1 is shown in part only in the figures. Only the neck 11 and a portion of the shoulder 14 of the reservoir 1 is shown in the figures. The neck 11 projects axially upwards from the shoulder 14 that already forms a portion of the reservoir body (not shown). The neck 11 internally defines an opening 10 that puts the inside of the reservoir into communication with the outside. The opening 10 is defined by an annular top edge 13 of the neck 11. Externally, the neck 11 forms one or more helical threads 12 that are in the form of one or more projecting ribs disposed in helical manner. The threads 12 can extend over all or part of the periphery of the neck 11. The threads 12 can be continuous, or, on the contrary, they can be interrupted. The purpose of the threads 12 is to enable a conventional turning movement to be combined with an axial movement. It is possible to talk about screwing/unscrewing movement. The reservoir 1 can be made of any material that makes it possible to obtain a collar that is rigid and not deformable. In particular, the reservoir can be made of glass, of metal, or even of a rigid plastics material.

The dispenser head 2 essentially comprises three component members, namely: a dispenser member 3 that can be a pump or a valve; a pusher 4 that is mounted on the dispenser member 3 so as to actuate it; and a fastener member 5, 6 that is in engagement both with the threaded neck 11 of the reservoir and with the dispenser member 3. Reference is made below to all of the figures while describing the structure of the dispenser head 2.

The dispenser member 3 includes a body 30 that defines, at one of its ends, an inlet 31 for the fluid coming from the reservoir. The body 30 forms a fastener collar 37 that projects radially outwards. The dispenser member 3 also includes an actuator rod 32 that projects upwards, out from the body 30, and that is axially movable down and up relative to the body. A return spring 33 urges the actuator rod 32 into the position in which it is extended to its maximum out from the body. The actuator rod 32 internally defines a flow channel for the fluid put under pressure inside the body 30. This design is entirely conventional for a pump or a valve in the fields of perfumery, cosmetics, or even pharmacy. Given that the internal structure of the dispenser member 3 is not critical for the present invention, it is not described in greater detail below.

The pusher 4 is mounted on the free end of the actuator rod 32 of the dispenser member 3. The fluid coming from the actuator rod 32 is conveyed via an internal channel to the dispenser orifice 42 formed by the pusher. In addition, the pusher includes a bearing surface 41 on which the user can press using one or more fingers so as to move the pusher 4 axially down and up. In this way, fluid, in optionally-metered form, is dispensed through the dispenser orifice 42. Here again, this design is entirely conventional for a fluid dispenser.

The fastener member comprises two distinct component elements, namely a fastener ring 5 and a blocking hoop 6. The hoop 6 is engaged around the ring 5 in such a manner as to mask all or part of it. One purpose of the hoop 6 is to deform the ring 5 radially inwards and to hold it in that state.

The ring 5 is advantageously made of a plastics material that is deformable and malleable making it possible to create zones that can be deformed easily, while other zones are more rigid. The ring 5 presents an overall configuration that is substantially circularly cylindrical about the axis of the dispenser. The ring 5 is preferably made as a single piece, but it is possible to distinguish three portions, each performing a distinct function.

Figure 2:
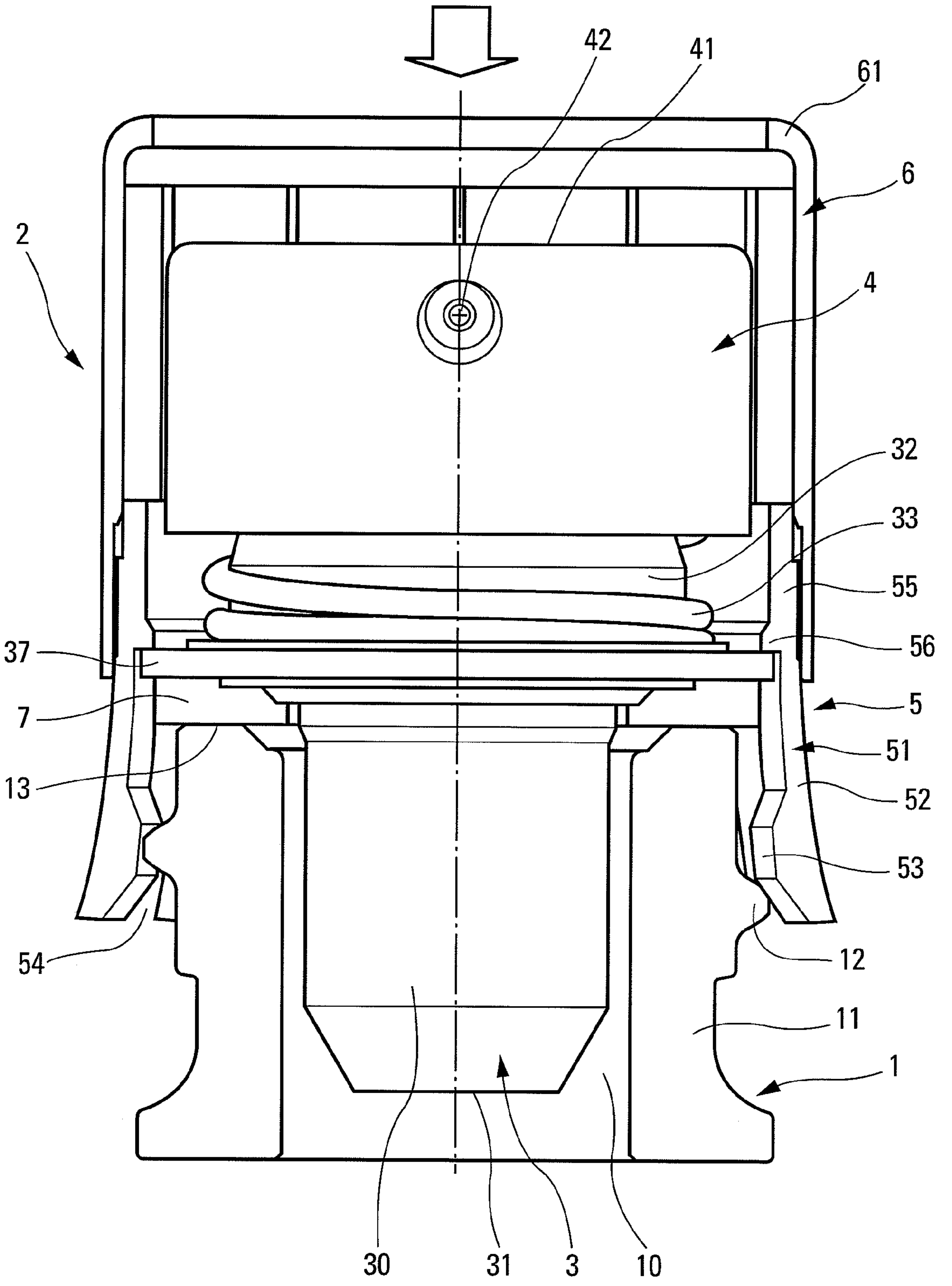
Figure 3:
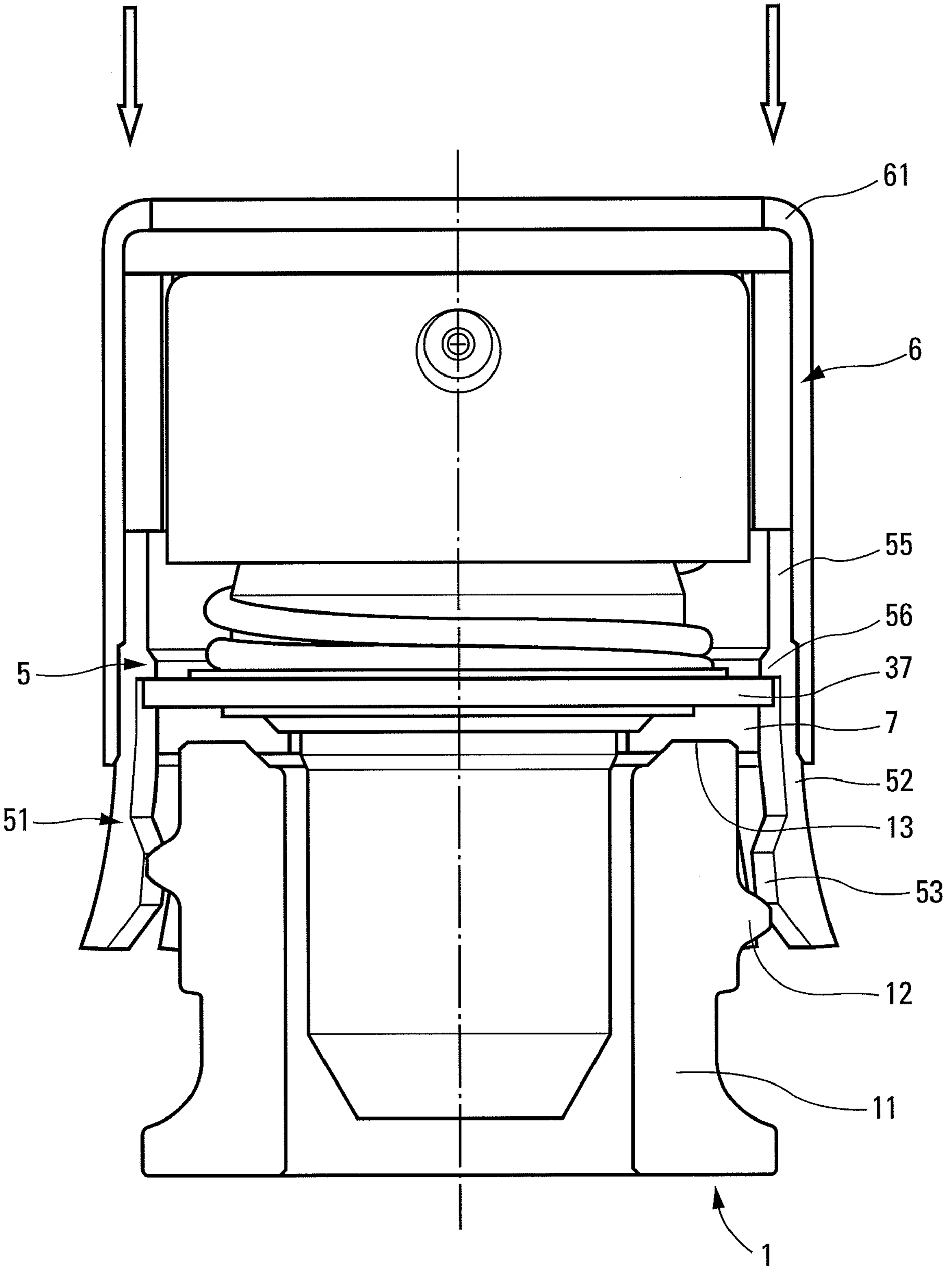
Figure 4:
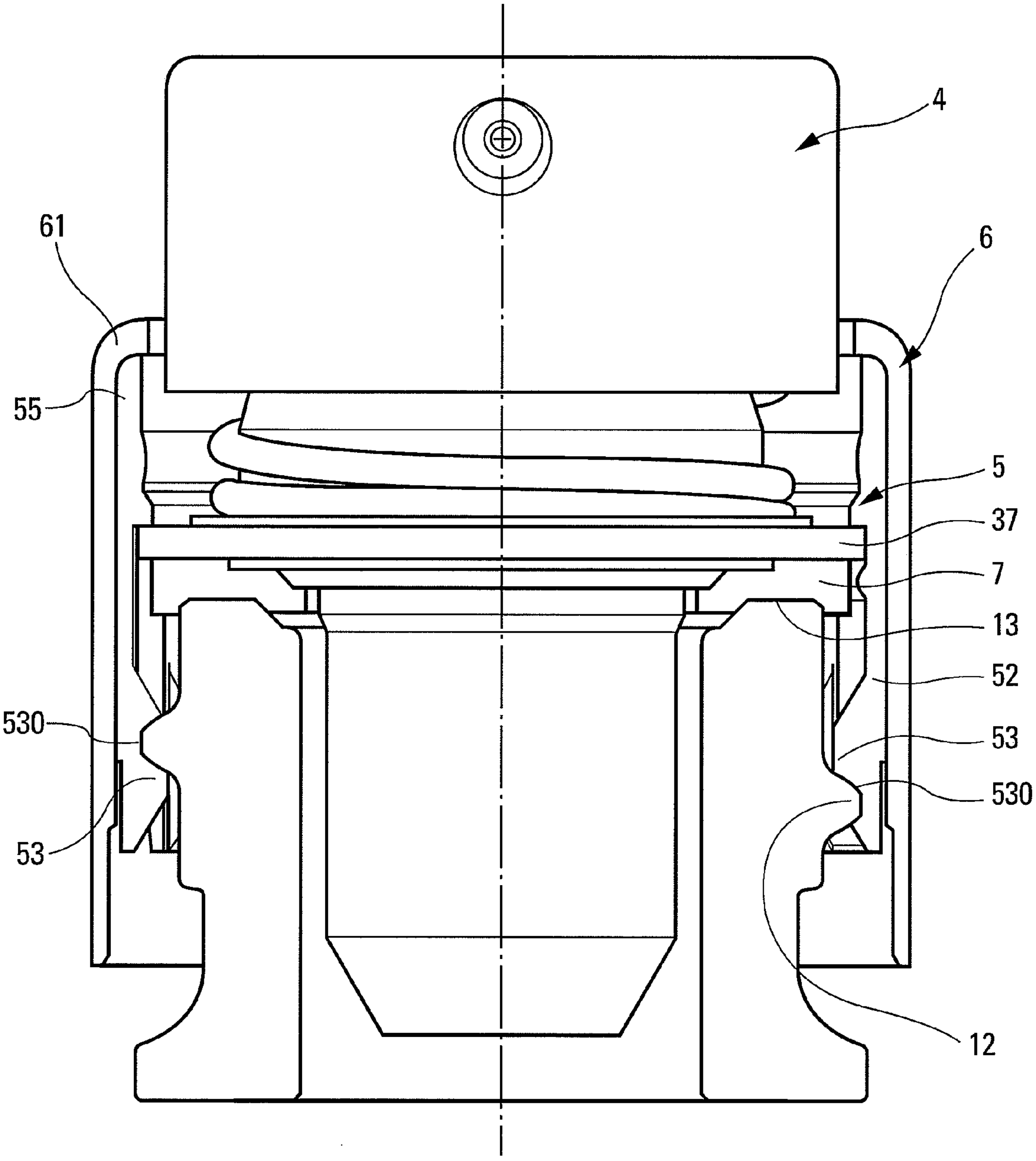
Figure 5:
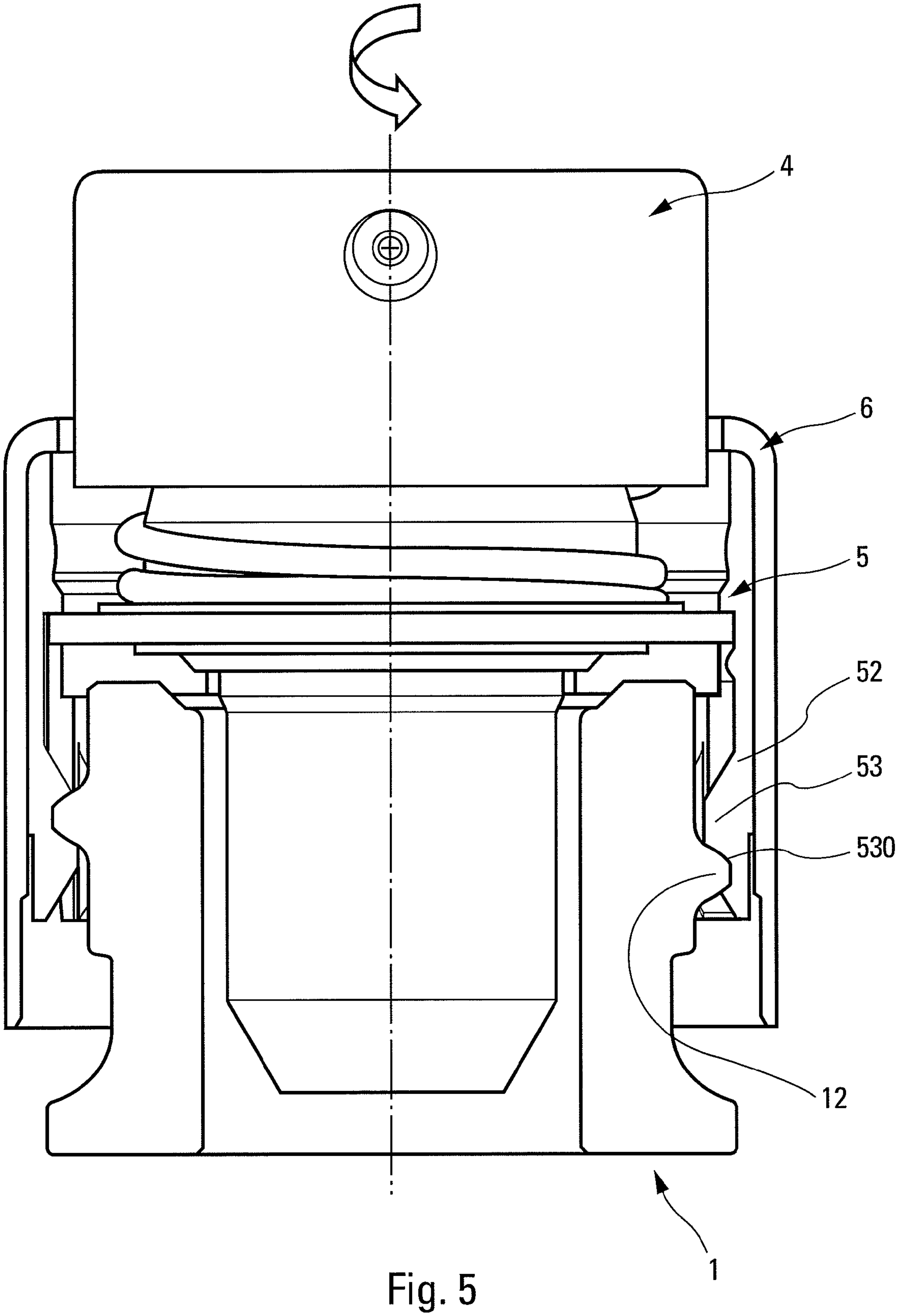

The ring thus includes a skirt 51 for coming into engagement about the threaded neck 11 of the reservoir. Consequently, the skirt 51 extends around the neck 11 down to below threads 12 in the mounted position, as shown in FIGS. 4 and 5. The skirt 51 can be continuous over its entire periphery in such a manner as to form a complete cylinder. In a preferred variant, as shown in the figures, the skirt 51 forms flexible tabs 52 that are separated by radial slots 54. This is clearly visible in FIG. 1. The number of tabs 52 can lie in the range three to more than ten. In the figures, the skirt 51 forms six flexible tabs 52 that are separated by six radial slots 54. The slots 54 can extend over all or part of the height of the skirt 51. In other words, a portion of the skirt can remain continuous, while another portion that is lower down is slotted to form the tabs. In the figures, the skirt 51 is slotted over its entire height. As a result of the skirt 51 being slotted, the tabs 52 present great flexibility, in particular in the radial direction. It can thus be deformed freely outwards and inwards without risk of damaging the tabs. The inside walls of the tabs (or of the skirt) can be completely smooth, or, on the contrary, in a preferred variant, the tabs are formed with beads 53 that project radially inwards. The beads 53 are situated in the proximity of the free bottom ends of the tabs 52. The beads 53 are preferably thin and elongate in the axial direction. They are thus in the form of separate small vertical splines or bars. The beads 53 can present beveled leading edges so as to make it easier to put the ring into place on the neck of the reservoir. By way of example, it is possible to provide two or three beads per tab. It can also be envisaged to provide only a single bead per tab, which bead extends over all or part of the radial width of the tab. In the figures, there are two beads per tab and six tabs, making a total of twelve beads for the skirt 51. The beads 53 are disposed on the skirt 51 in such a manner as to come to be positioned on the threads 12, as can be seen in FIGS. 2 to 5. The beads 53 are for being plastically deformed against the threads 12 of the neck 11, as described below.

In addition to the skirt 51, the ring 5 also forms a guide and preassembly bushing 55 that extends upwards in register with the skirt 51. The bushing 55 presents a configuration that is substantially cylindrical, with a diameter that is appropriate for receiving the hoop 6, as described below.

At the junction between the bushing 55 and the skirt 51, the ring 5 forms a bearing flange 56 that projects radially inwards. The flange 56, that can be continuous over the entire periphery, or, on the contrary, that can be interrupted, is for coming into engagement with the collar 37 of the body 30 of the dispenser member 3, so as to push it towards the top edge 13 of the neck 11, with a neck gasket 7 possibly being interposed therebetween. Thrusting the flange 56 against the collar 37 thus causes the neck gasket 7 to be compressed against the annular edge 13 of the neck 11. Good sealing is thus provided between the dispenser member 3 and the neck 11. The compressed state of the gasket 7 is provided solely by the press used to mount the dispenser head, and not by the deformation of the skirt 51, as occurs with prior-art fastener members.

The blocking hoop 6 can be a visible hoop that is attractive, or, on the contrary, it can be an internal hoop that is not visible.

In the figures, the hoop 6 is a visible covering hoop that can be made of metal, for example. The hoop 6 is generally cylindrical with an inwardly-directed top rim 61 for coming into abutment against the free top end of the bushing 55. The inside diameter of the hoop 6 is slightly smaller than or equal to the outside diameter of the ring 5. The hoop 6 thus constrains and holds the ring 5 in a substantially-cylindrical and blocked configuration.

Figure 6:
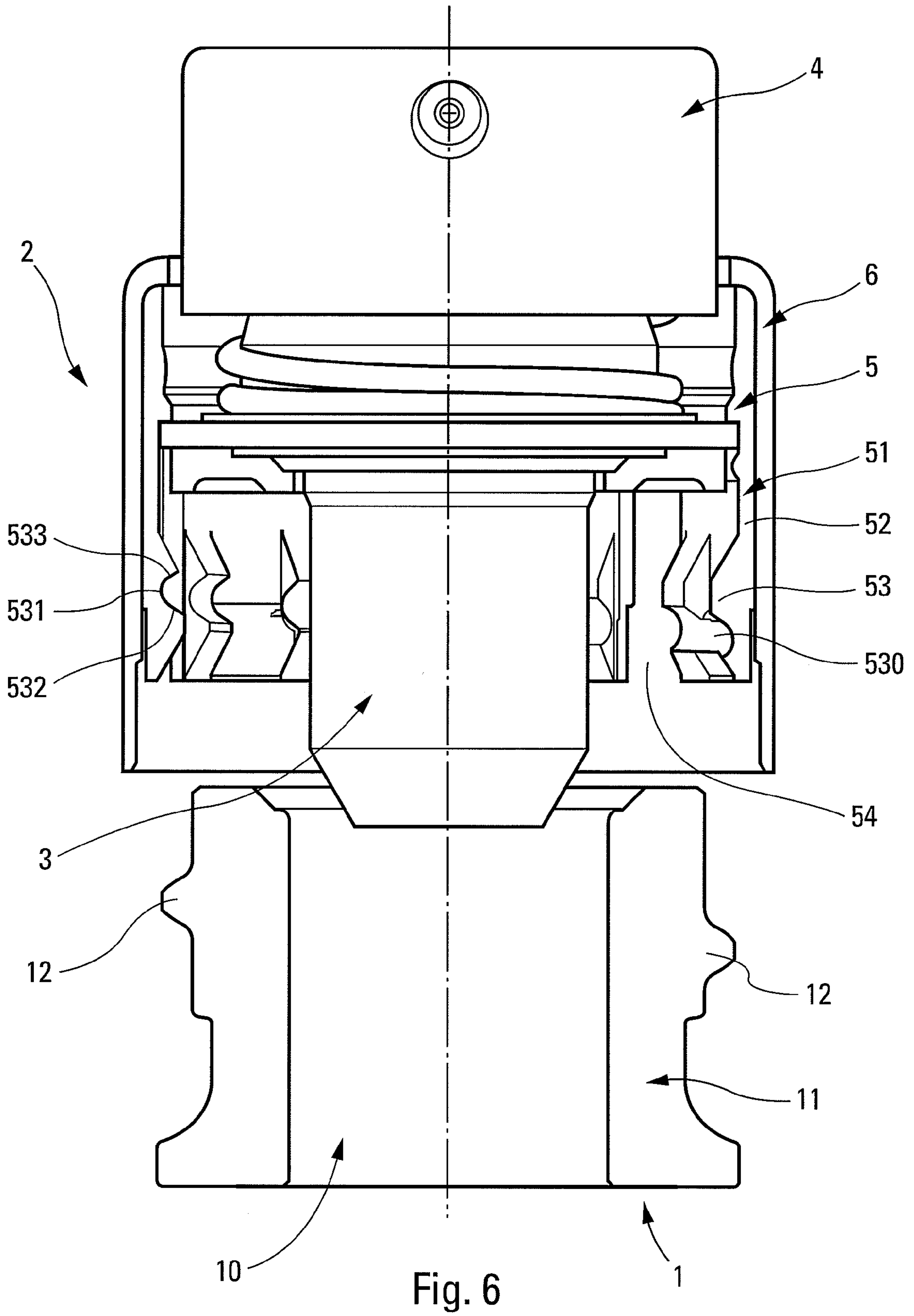

Reference is made below consecutively and in order to the various figures, so as to describe a cycle for mounting a dispenser head on a threaded reservoir-neck and for removing it therefrom. In FIG. 1, the dispenser head 2 is not yet in engagement with the neck 11. The tabs 52 of the skirt 51 thus extend in completely cylindrical manner, without being subject to any deformation. The hoop 6 is pre-engaged around the ring 5 at the bushing 55. The ring 5 and the hoop 6 thus constitute a single sub-unit that is inseparable, and that is therefore held captive. In addition, the bushing 55 makes it possible to hold and to guide the hoop 6 accurately axially. It should be observed that the hoop 6 is not yet engaged around the skirt 51. The first mounting step consists in engaging the skirt 51 around the threaded neck 11. This is shown in FIG. 2. The dispenser member 3 thus being engaged inside the opening 10 of the neck. The gasket 7 disposed under the collar 37 is thus in contact with the top edge 13 of the neck 11. The beads 53 formed at the tabs 52 are disposed on the threads 12. It should be observed that the tabs 52 are slightly deformed outwards, as a result of the beads 53 coming into contact with the threads 12. The beads 53 are not yet deformed against the threads 12. The third mounting step consists in lowering the hoop 6 around the ring 5. This is performed by exerting pressure on the inwardly-directed rim 61 of the hoop 6. The pressure makes it possible to flatten the neck gasket 7 so as to provide sealing. The hoop 6 thus begins to be engaged around the skirt 51, as can be seen in FIG. 3. The beads 53 begin to be pressed hard against the threads 12. The operation of lowering or engaging the hoop 6 around the ring 5 continues until the hoop 6 surrounds the ring 5 completely, as shown in FIG. 4. This corresponds to the final mounted position in which the beads 53 of the tabs 52 are deformed against the threads 12 in such a manner as to create thread imprints 530 in the material constituting the beads 53. In this final mounted position, the inwardly-directed rim 61 is in abutment against the top end of the bushing 55. It is also possible to determine the final mounted position when the bottom end of the hoop 6 comes into abutment contact with the shoulder of the reservoir. To do this, it suffices to provide a hoop that is slightly taller. As a result of the threads 12 extending in helical manner, the thread imprints 530 are formed at different axial levels on the various beads 53. For example, in FIG. 4, the thread 12 in the right-hand portion forms an imprint 530 that is in the proximity of the bottom end of the bead 53, whereas in the left-hand portion, the imprint 530 is formed towards the top of the bead 53. The threads advantageously come into contact with the skirt 51 only at the beads 53. Thus, contact between the skirt and the neck occupies only part of the periphery, and preferably extends over less than half the periphery of the neck. This applies when there are only twelve beads 53 distributed around the periphery. This interrupted contact makes it possible to reduce the friction forces between the skirt and the neck considerably, thereby making it possible to unscrew the dispenser head manually. This is shown in FIG. 5 in which the applied torque is symbolized by the curved arrow shown above the pusher 4. The torque is applied directly on the hoop 6 that is in clamping contact with the ring 5. Contact between the hoop and the ring extends over the entire periphery and advantageously over almost the entire height of the ring. The friction between the ring and the hoop is therefore considerably greater than the friction between the beads 53 and the threads 12. Unscrewing is thus made possible. Once the unscrewing operation has been completed, the dispenser is in the configuration shown in FIG. 6. The thread imprints 530 that have been created in the beads 53 can thus clearly be seen. Each imprint 530 comprises an imprint bottom wall 531 that is bordered by two opposite imprint flanks 532 and 533. This demonstrates that the thread imprints 530 are formed without generating traction on the tabs 52. In other words, the inwardly-directed radial thrust created by the hoop 6 is not transformed into thrust with an axial component while the beads 53 are making contact with the threads 12. The compression of the neck gasket 7 is thus obtained and controlled entirely by the force exerted by the mounting press. Such imprints 530 can be obtained merely as a result of the beads extending on either side of the threads 12. There is therefore no cam effect or force-direction transformation effect while the beads 53 are being deformed. The deformation of the beads 53 is plastic deformation by instantaneous and/or subsequent movement of material, in particular by creep. It is known that plastics materials tend to creep over time in order to achieve a final deformed state. In the context of the present invention, the creep phenomenon is used to advantage, given that a relatively lengthy period of time passes between the dispenser being mounted and the dispenser head being unscrewed when the reservoir is empty. Once the dispenser head has been unscrewed, the thread imprints 530 remain in this state so as to form a permanent complementary thread. The plastics material constituting the beads 51 does not deform back again by shape memory, given that the material has been subject to creep over a lengthy period.

By means of the invention, it is possible to fasten a dispenser head on a reservoir with a threaded neck without performing a screw tightening operation, while making it possible to unscrew the head so as to enable the reservoir to be refilled or the dispenser to be recycled by separating the reservoir from its dispenser head.

The invention claimed is:

1. A fluid dispenser comprising:

a fluid reservoir (1) provided with a neck (11) that is externally threaded and that internally defines an opening (10) that communicates with the inside of the reservoir, the neck (11) forming at least one helical thread (12);

a dispenser head (2) mounted on the neck (11) of the reservoir (1), the head (2) comprising: a dispenser member (3); a pusher (4) for actuating the dispenser member (3); and a fastener member (5, 6) engaged both with the threaded neck (11) of the reservoir (1) and with the dispenser member;

the fastener member (5, 6) comprises:

a deformable and malleable skirt (51) for coming into engagement with the threaded neck (11); and a rigid hoop (6) that is engaged around the skirt (51) so as to push the skirt radially against the threaded neck (11) in such a manner as to deform the skirt (51) against the thread (12) so as to create a thread imprint (530) in the skirt.

2. A dispenser according to claim 1, in which the skirt (51) comes into contact with the neck (11) over less than half the periphery of the neck.

3. A dispenser according to claim 1, in which the skirt (51) is internally provided with a plurality of beads (53) for being deformed by the thread (12) of the neck (11).

4. A dispenser according to claim 3, in which the beads (53) are elongate and extend substantially transversally to the thread (12).

5. A dispenser according to claim 3, in which the beads (53) extend on either side of the thread (12).

6. A dispenser according to claim 3, in which at least one thread imprint (530) is formed in some of the beads (53), each imprint (530) comprising a bottom wall (531) and two opposite flanks (532, 533).

7. A dispenser according to claim 1, in which the skirt (51) is made of a plastics material, that is more deformable than the at least one helical thread of the neck.

8. A dispenser according to claim 1, in which the skirt (51) includes flexible tabs (52) that are separated by slots (54).

9. A dispenser according to claim 8, in which each tab (52) is provided with at least one elongate bead (53).

10. The dispenser according to claim 1, wherein the dispenser member is a pump or a valve.

11. The dispenser according to claim 8, wherein the flexible tabs are configured to splay apart when the skirt is mounted on the threaded neck and prior to fully engaging the rigid hoop around the skirt.

* * * * *